United States Patent [19]

Stędfeldt

[11] Patent Number: 5,246,580
[45] Date of Patent: Sep. 21, 1993

[54] APPARATUS FOR SEPARATING SOLID PARTICLES FROM A LIQUID

[76] Inventor: Hans Stędfeldt, Solbacksvägen 19, S-147 41 Tumba, Sweden

[21] Appl. No.: 943,518

[22] Filed: Sep. 11, 1992

Related U.S. Application Data

[62] Division of Ser. No. 745,848, Aug. 16, 1991.

[51] Int. Cl.⁵ .............................................. B01D 21/02
[52] U.S. Cl. ................................... 210/407; 210/108; 210/391; 210/797
[58] Field of Search ............... 210/106, 108, 391, 393, 210/394, 411, 407, 412, 780, 781, 784, 791, 797

[56] References Cited

U.S. PATENT DOCUMENTS 3,954,613 5/1976 Worlidge ........................... 210/108

FOREIGN PATENT DOCUMENTS

WO875005 7/1987 World Int. Prop. O. .

OTHER PUBLICATIONS

New Swedish Technology, vol. 8, No. 1, p. 2.

Primary Examiner—Robert A. Dawson
Assistant Examiner—David Reifsnyder
Attorney, Agent, or Firm—Banner, Birch, McKie & Beckett

[57] ABSTRACT

An improved method for separating solid particles from liquids, such as dewatering and thickening of sludge collected in a container (1), involves the use of at least one drainage unit (9) having doubled screened jacket walls (25, 26) defining a dewatering chamber (10). The liquid relieved of solids within the chamber is subjected to a turbulent motion acting against said screened jacket walls for obstruction of the solids deposition at the wall surfaces of the chamber facing the sludge in the container. The turbulent motion is obtained by a forced fluid F introduced in the chamber through one or more tubes (30, 31). The fluid may favourably be in form of compressed air or water returned from the reject system (14, 16).

11 Claims, 4 Drawing Sheets

APPARATUS FOR SEPARATING SOLID PARTICLES FROM A LIQUID

This application is a division of application Ser. No. 07/745,848, filed Aug. 16, 1991.

TECHNICAL FIELD

The present invention relates to an improved method for separating solid particles from liquids such as dewatering and thickening of sludge produced at municipal and private sewage treatment plants as well as of sludge derived from industrial operations. The invention also extends to an improved apparatus for such dewatering and thickening of sludge products.

BACKGROUND ART

From the international patent application WO87/05005 made public on Aug. 27, 1987 a method and an apparatus for the purpose of treating sludge is known. The dewatering process described therein is discontinuous and to obtain a satisfying capacity the apparatus has to be given rather large dimensions. However, the construction of the dewatering apparatus is often restricted by the size of the basin or container in which the dewatering apparatus is to be inserted.

The reason to the discontinuous working of the apparatus described in WO87/05005 is that the screened jacket walls during the dewatering process gradually are obstructed by sludge and the removal of reject water through the walls will be more and more slow and finally being completely stopped. The working time up to such a complete obstruction of the dewatering process will depend on the quantity of solids in the sludge to be dewatered. Thus, the dewatering time is shorter the thicker the sludge is. Also other factors are affecting the time of the dewatering process, such as e.g. the use of an unsuitable polymer, insufficient mixture of the polymer in the sludge, the quantity of fat in the sludge, etc. The apparatus known from WO87/05005 requires cleaning intervals during which the screened jacket walls are cleaned by flushing means.

To be able to use flushing means in the dewatering apparatus known per se the basin or the container within which the apparatus is introduced has to be emptied of sludge. Thus, the effective working time for the dewatering process is decreased and has to be interrupted by cleaning periods when the basin or container is emptied.

BRIEF SUMMARY OF THE INVENTION

The aim of the present invention is to greatly increase the effectiveness of the known dewatering process described in WO87/05005. Such an increased effectiveness would be obtained if the screened jacket walls could be cleaned simultaneously and continuously with the process of dewatering the sludge in the basin or container.

An improved drainage method is obtained according to the present invention by making use of one or more drainage units being inserted in a sludge receptacle or pool. Each one of the drainage units has screened jacket walls defining dewatering chamber or chambers from which the liquid, relieved of solids, is removed through a reject system. The dewatered and thickened sludge remaining in the receptacle or pool outside the drainage unit or units is removed through a bottom outlet. The liquid within each chamber is subjected to a turbulent motion acting against the screened jacket walls in such a way that deposition of solids on the wall surfaces facing the liquid suspension in the receptacle or pool is prevented. In other words, build up of solids on the outside of the dewatering chamber is prevented by the turbulent motion acting in the annular space between the jacket walls.

A turbulent motion in the liquid relieved of solids within the drainage unit is obtained by introduction of a forced fluid flow into chamber between the screened jacket walls. The fluid may be a gas, e.g. air, as well as a liquid, such as water. If using liquid one may very well make use of the liquid that is removed through the reject system.

The improved drainage system according to the present invention includes one or more drainage units inserted in a sludge receptacle or pool, each such a unit comprising a dewatering chamber defined by double screened jacket walls;

a reject system connected to said dewatering chamber for removing the liquid collected in the chamber and relieved of solids;

a bottom outlet connected to the receptacle or pool for removing the dewatered and thickened sludge remaining in the receptacle or pool outside of the drainage unit or units; and turbulence maker means arranged within the dewatering chamber of each the drainage units. The turbulence maker means impose a circulation on the liquid relieved of solids within the chamber to prevent solid deposition at the wall surfaces facing the liquid suspension in the receptacle or pool.

Favourable embodiments of the systems according to the present invention are defined by the claims.

By making use of the method according to the present invention the flushing means known per se may be dispensed with. However, the combination of the turbulence maker and the flushing means will result in a highly effective drainage system for sludge treatment. In such a case it will be favourable to design the drainage unit in a hollow cylinder with the flushing means arranged within the center as shown and described in WO087/05005 and with the turbulence making means introduced in the dewatering chamber. To obtain a most effective drainage unit it is then suitable to have the cylindrical drainage unit rotate while the flushing and the turbulence making means are kept stationary.

The drainage system according to the present invention, besides having a considerably increased capacity by making use of the turbulent motion of the liquid within the dewatering chamber, the improved method decreases or completely eliminates the use of polymers. Consequently the improved method results in lower operating costs.

DESCRIPTION OF PREFERRED EMBODIMENTS

Figure 2:
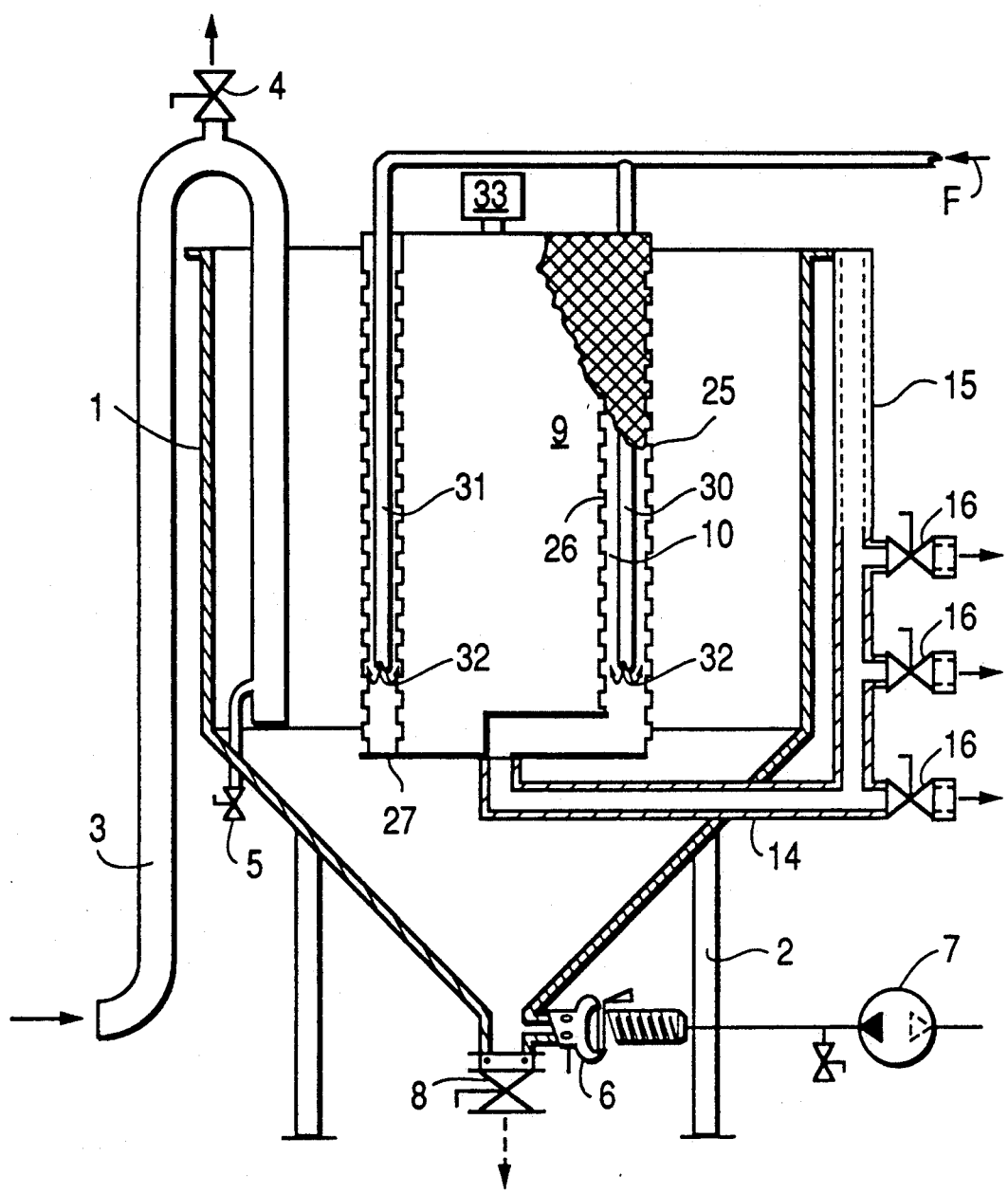
Figure 3:
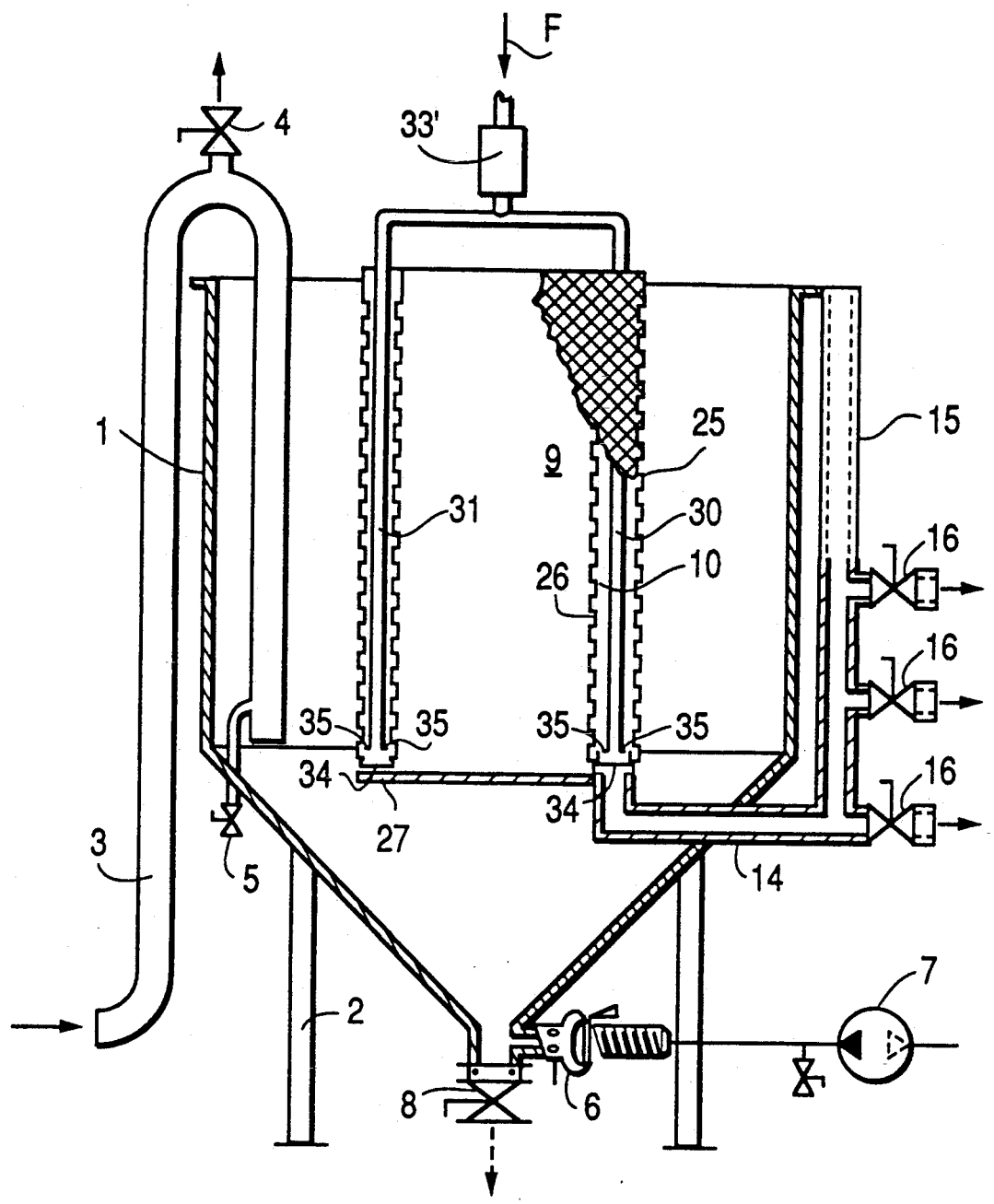
Figure 4:
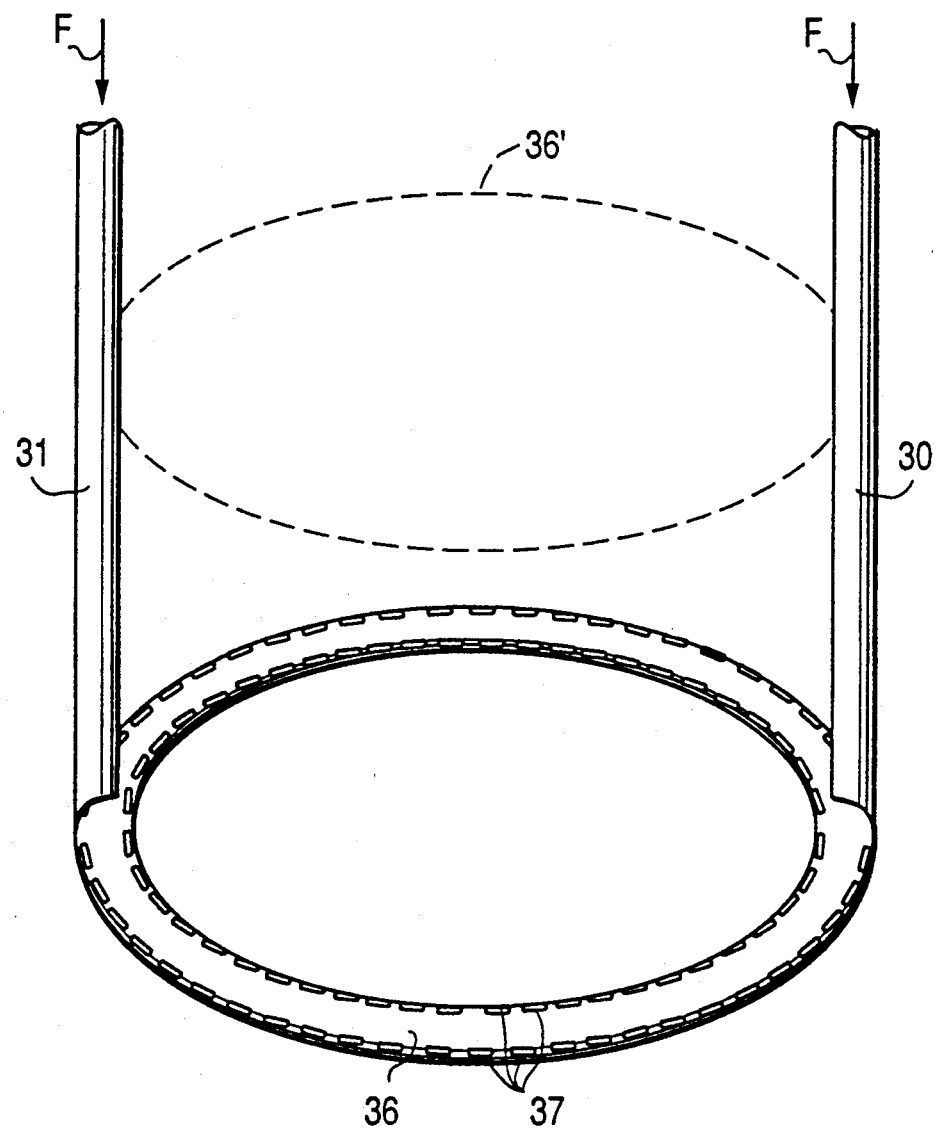

The improved method of the present invention will be more readily understood from the description given below with reference to different preferred embodiments of the improved apparatus according to the invention. The continued description will be given under reference to the accompanying drawings, where FIG. 1 shows a sectional side elevation of a sludge container accomodating a double wall drainage unit of prior art, FIG. 2 shows a similar sectional side elevation of a sludge container comprising a first embodiment of the drainage unit according to the present invention, FIG. 3 shows a somewhat modified embodiment of the container and drainage unit in FIG. 2, and FIG. 4 shows a perspective view of a second embodiment of the turbulence making means, e.g. to be inserted in the drainage unit shown in FIG. 1.

Figure 1:
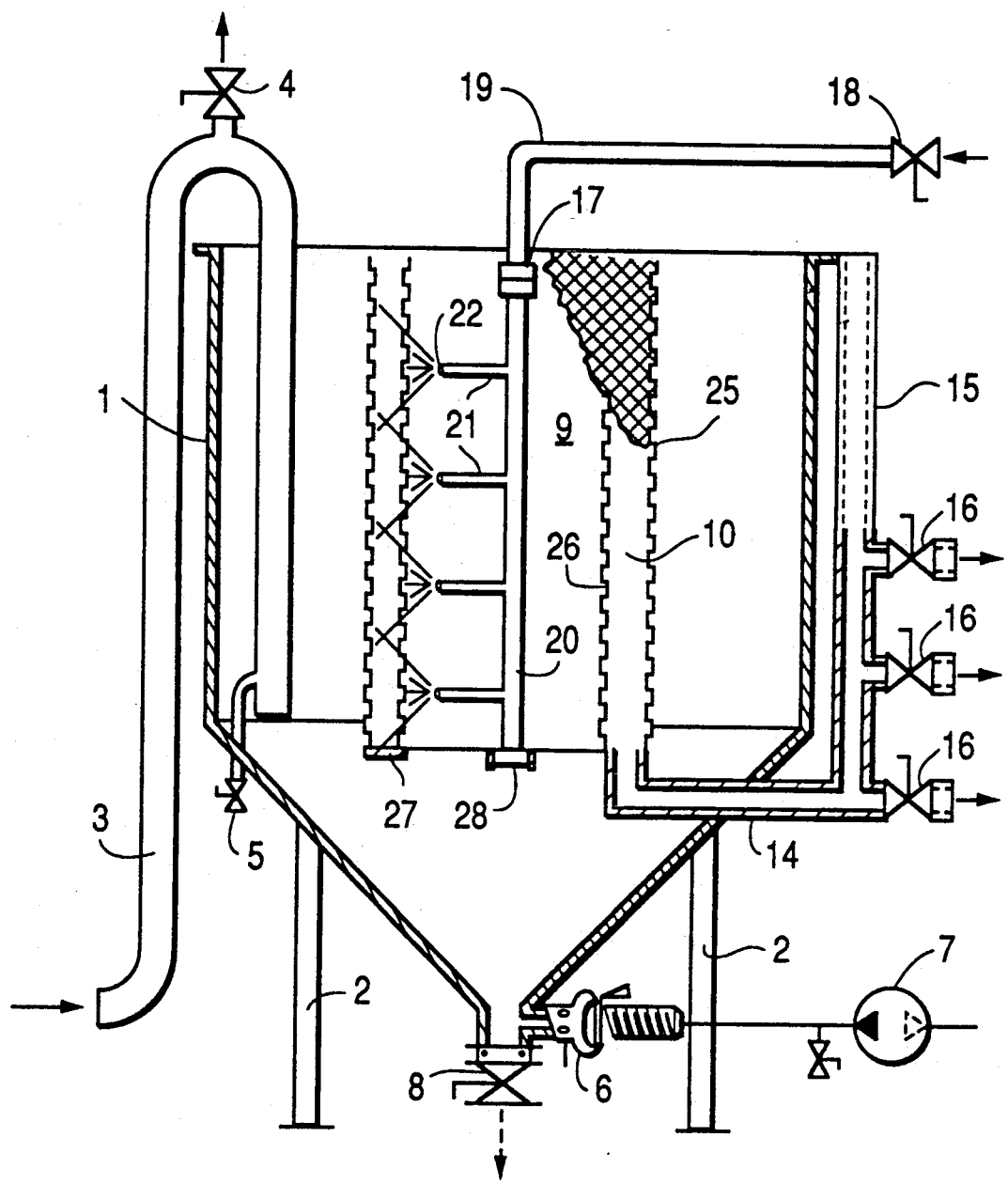

With reference to the drawings the apparatus shown in FIG. 1 is a typical arrangement for dewatering and thickening of sludge as described in the international patent application WE 87/05005. Such an apparatus involves a sludge container 1 a typically open, cylindrical container with a conical bottom region. The container 1 may as well take the shape of a pool or basin as described in the paper New Swedish Technology, Vol. 8, No. 1, 1989, page 2.

The sludge container 1 rests on supporting legs 2. The liquid suspension of solid particles to be dewatered is transferred to the container 1 by an inlet conduit 3 having an air bleeder valve 4 and a branch pipe 5 for sampling the sludge suspension pumped into the container. An alternative inlet 6 for the sludge suspension to be processed in the container 1 is connected to the tip of the conical bottom region of said container. The alternative inlet 6 includes a pump 7, e.g. an eccentric screw pump. Said inlet 6 and pump 7 may be used for pumping out the dewatered sludge but generally the dewatered sludge is tapped off through a bottom outlet 8 having a valve connected to the tip of the conical bottom region.

In the container 1 there is disposed a drainage unit 9 consisting of an upwardly open double-walled cylinder 10 with screened inner 26 and outer 25 jackets. The inner jacket 26 and the outer jacket 25 are interconnected with an annular base portion 27. The space defined by the two jackets 25 and 26 and by said annular bottom 27 forms the dewatering chamber 10 having an annular cross section.

The chamber 10 is connected to a level pipe 15 through a reject outlet conduit 14 starting at the bottom 27 of the dewatering chamber 10. Said level pipe 15 is equipped with valve fitted reject outlets 16 disposed at different heights along the level pipe. By selection of any one of the outlets 16, e.g. by a control equipment (not shown) the dewatering process may be extended to a predetermined level for achievement of a desired, precalculated increase of the dry solids content in the sludge remaining outside of the walls 25 and 26 in the container 1.

The screened inner and outer jackets 26 and 25 will be obstructed by sludge deposited on the outside surfaces facing the container 1 area. To clean the surfaces the drainage unit of prior art is provided with a flushing system used between the dewatering cycles. The prior art flushing system of FIG. 1 consists of a vertical central pipe 20 along the length axis of cylinder 10. The pipe 20 is rotatably journalled in a cross-beam 28 at the bottom end and is connected to a flushing liquid conduit 19 through a swivel link 17 at the open top end of the cylinder 10. Said flushing liquid conduit 19 includes a valve 18 for control of the flow of the flushing liquid, i.e. of the water. The central pipe 20 has a number of branch tubes 21 each one ending with one or more nozzles 22. By having the direction of said nozzles 22 inclined somewhat towards the jacket 26 of the chamber 10 the pressurized water supplied therethrough gives the flushing system a rotation. Thus, the pressurized water from the nozzles 22 of the rotated flush system is acting against the inner screened jacket 26 as well as through said inner jacket 26 and against the outer screened jacket 25.

As mentioned in the application referred to above the working of the apparatus known per se is discontinuous. Thus, the dewatering process has to be interrupted by a cleaning action when the flushing system is used after emptying the container 1 of dewatered sludge. The consequence of such a discontinuous working will be a reduced effectiveness.

According to the present invention the effectiveness of the dewatering process is highly improved by increasing the length of the dewatering cycle. This is obtained by imparting a turbulent motion to the liquid inside the chamber 10 during the dewatering process. Such a turbulent motion can be obtained in different ways and in connection with FIGS. 2 through 4 some preferred embodiments will be described below.

The reference numbers used in FIGS. 2 through 4 similar to those of FIG. 1 do concern similar constructive details having the same functions.

The drainage unit 9 shown in FIG. 2 has been equipped with a turbulence maker means according to the present invention. The embodiment of the turbulence maker means shown includes two tubes 30, 31 introduced axially within the dewatering chamber 10 and having an end opening 32 directed to the bottom 27 of the chamber. The tubes 30, 31 are finished close to the bottom 27, e.g. 30 through 40 centimeters above the bottom. Both the tubes 30, 31 are connected to a source of a compressed fluid indicated by the arrow F.

The fluid F to be used may be a liquid, e.g. the reject water from the reject system 14, 15, 16 being compressed by a pump (not shown). However, preferably the fluid F used is compressed air obtained from a compressor or flask (not shown). The air forms a steady stream of bubbles along the walls of the screened jackets 25, 26. The stream of bubbles imparts to the liquid relieved of solids within the chamber 10 a turbulent motion acting against the screened jackets 25, 26. Thus, deposition of solids on the screened wall surfaces facing the liquid suspension in the container 1 is prevented.

To enhance the turbulent motion of the liquid inside the chamber 10, a relative rotatory movement is provided between the tubes 30, 31 and the screened jackets 25, 26. In the embodiment shown in FIG. 2 the rotation is obtained by a motor 33 driving the drainage unit 9 while the turbulence making means, i.e. the tubes 30, 31 are stationary. In other words, the drainage unit 9 rotates while the tubes 30, 31 are stationary within the annular chamber 10.

A modified embodiment of the turbulence making means is shown in FIG. 3. The modification is to be found in that the ends of the tubes 30 and 31 are connected to manifolds 34 equipped with nozzles 35. The nozzles 35 are directing the forced fluid F in an upward direction along the screened jackets 25, 26 of the chamber 10.

The modified turbulence making means shown in FIG. 3 may be kept stationary and the drainage unit 9 may be rotated in the same way as shown in FIG. 2. However, FIG. 3 shows a modified driving means 33' for rotating the turbulence making means 30, 31 while keeping the drainage unit 9 in a fixed position. The driving means 33' then includes a driving motor and a swivel link connecting the fluid source to the two tubes 30 and 31.

A second embodiment of the drainage system according to the present invention is partly shown in FIG. 4. Only the turbulence making means is illustrated in FIG. 4 and in operation it is introduced into a dewatering chamber 10 of similar design as shown in FIGS. 1 through 3. The turbulence making means includes at least one fluid distribution tube or ring 36 being mainly parallel to the bottom (27) of the chamber (10). The wall of the distribution tube 36 is perforated with openings 37 from which the forced fluid is introduced against the screened jackets (25, 26) defining the dewatering chamber. The openings 37 may be designed as nozzles. The fluid distribution tube 36 is supplied with fluid from two tubes 30 and 31 being connected to a fluid source in a similar way as shown in FIGS. 2 or 3.

As indicated by the dashed line 36' the turbulence making means may include more than one distribution tube 36. Thus, there may be a number of distribution tubes 36, 36' arranged at different heights above each other along the dewatering chamber. Each one of the distribution tubes 36, 36' may be supplied with fluid by separate vertical tubes 30 and 31 or by such tubes 30, 31 common for all distribution tubes 36, 36' used.

By using fluid distribution tubes 36 there is no need for any relative rotation between the drainage unit 9 and the turbulence making means. Thus, the driving means 33 and 33' respectively shown in FIGS. 2 and 3 can be dispensed with.

A drainage system designed according to the principle of the second embodiment shown in FIG. 4 is also well suited for dewatering chambers 10 having a non-cylindric shape, i.e. being designed as mutually spaced flat cells within the sludge container 1. If so, the distribution tubes 36, 36' are designed to follow the non-cylindric shape of the dewatering chambers 10.

All the embodiments shown in FIGS. 2 through 4 have made use of two tubes 30 and 31 for introducing of the fluid F into the dewatering chamber 10. Though the number of tubes preferably is two, any optional number from one and upwards may be used.

Though having described some preferred designs of the improved drainage system according to the invention above the problems may be solved also by other solutions without leaving the inventive idea as defined by the annexed claims. Thus, the turbulence making means may take the form of a mechanical stirring means immersed in the liquid within the drainage chamber 10. The stirring means are then driven by a motor.

For the moment the best result has been obtained by using compressed air as the forced liquid F. The quantity of compressed air to be introduced in the drainage chamber 10 depends on how prone the wall surfaces are to sludge solids deposition. It is also dependent on the velocity of the reject water removal from the drainage chamber 10.

The supply of compressed air F may favourably be of intermittent duration. Thus, the method may comprise a compressed air supply being started just before the start of the removal of the dewatered and thickened sludge through the bottom outlet 8 of the container 1. By doing so a movement is obtained in the "finished" dewatered sludge and further water can reach the screened jacket walls 25 and 26 to pass therethrough as reject water. The quantity of solid particles in the sludge will be increased.

Although there have been described above specific embodiments of a drainage system for realization of the improved method for separation of solid particles from a liquid in accordance with the invention for the purpose of illustrating the manner in which the invention may be used to advantage, it will be appreciated that the invention is not limited thereto. Accordingly any and all modifications, variations or equivalent arrangements which may occur to those skilled in the art should be considered to be within the scope of the invention as defined in the annexed claims.

I claim:

1. An improved system for dewatering sludge by separating and draining liquid from solid suspensions in a container, comprising:

a drainage unit in said container, said drainage unit including double screened jacket walls defining therebetween an annular dewatering chamber, means for moving the liquid from said container through said jacket walls into said annular dewatering chamber to separate the liquid from the solid suspensions leaving the thickened and dewatered sludge containing the solid suspensions in said container;

means for imparting turbulence to the separated liquid, said turbulence imparting means being arranged within said annular dewatering chamber of said drainage unit to prevent deposition of solids on said jacket walls of said annular dewatering chamber while the liquid is being separated therefrom;

means for draining the separated liquid collected in said annular dewatering chamber; and means for removing the dewatered and thickened sludge remaining in the container outside of said drainage unit.

2. The improved system according to claim 1, wherein said turbulence imparting means comprises a plurality of tubes disposed axially in said annular dewatering chamber, and means for delivering a fluid under pressure to said tubes, the release of the fluid in said annular dewatering chamber imparting turbulence to the separated fluid along said jacket walls to prevent deposition of solids thereon.

3. The improved system according to claim 2, wherein said means for delivering the fluid includes a manifold at the end of said tube connected to a nozzle disposed to direct the fluid under pressure along said jacket walls of said annular dewatering chamber.

4. The improved system according to claim 3, wherein said nozzle of each said tube is disposed near the bottom of said annular dewatering chamber.

5. The improved system according to claim 2, further comprising a tubular distribution ring connected to and in fluid communication with said tubes, said distribution ring arranged within said annular dewatering chamber and including perforations for releasing the fluid under pressure to impart turbulence to the separated fluid along said jacket walls.

6. The improved system according to claim 5, wherein said distribution ring is disposed near the bottom of said annular dewatering chamber.

7. The improved system according to claim 2, further comprising means for effecting relative rotation between said tubes and said screened jacket walls circumferentially of said annular dewatering chamber to enhance the turbulence around said jacket walls.

8. The improved system according to claim 2, wherein the fluid under pressure is a liquid.

9. The improved system according to claim 2, wherein said fluid under pressure is the separated liquid removed from said container.

10. The improved system according to claim 2, wherein said fluid under pressure is a gas.

11. The improved system according to claim 1, wherein said means for imparting turbulence is disposed near the bottom of said annular dewatering chamber.

* * * * *